(12) United States Patent
Rouet

(10) Patent No.: US 11,351,586 B2
(45) Date of Patent: Jun. 7, 2022

(54) APPARATUS AND METHOD FOR PRODUCING AN ELONGATED PROFILED PART

(71) Applicant: VOESTALPINE KREMS GMBH, Krems an der Donau (AT)

(72) Inventor: Christian Rouet, Gedersdorf (AT)

(73) Assignee: voestalpine Krems GmbH, Krems an der Donau (AT)

( * ) Notice: Subject to any disclaimer, the term of this patent is extended or adjusted under 35 U.S.C. 154(b) by 607 days.

(21) Appl. No.: 15/537,867

(22) PCT Filed: Dec. 21, 2015

(86) PCT No.: PCT/EP2015/080895
§ 371 (c)(1),
(2) Date: Jun. 19, 2017

(87) PCT Pub. No.: WO2016/097426
PCT Pub. Date: Jun. 23, 2016

(65) Prior Publication Data
US 2017/0348748 A1    Dec. 7, 2017

(30) Foreign Application Priority Data
Dec. 19, 2014  (EP) ................................. 14199470

(51) Int. Cl.
*B21D 5/08*   (2006.01)
*B21D 35/00*  (2006.01)
(Continued)

(52) U.S. Cl.
CPC .............. *B21D 5/083* (2013.01); *B21D 5/06* (2013.01); *B21D 35/00* (2013.01); *B23K 26/0093* (2013.01); *B21D 22/26* (2013.01)

(58) Field of Classification Search
CPC . B21D 5/06; B21D 5/08; B21D 5/083; B21D 22/26; B21D 35/00; B21D 35/002; B21D 35/001; B23K 26/0093
See application file for complete search history.

(56) References Cited

U.S. PATENT DOCUMENTS 3,119,432 A * 1/1964 Rogers .................... B21D 5/06
                                                    72/475
5,142,894 A * 9/1992 Gutowski ............. B21D 5/083
                                                    72/129
(Continued)

FOREIGN PATENT DOCUMENTS

DE       10011755 A1    9/2001
EP       1344583 A1 *   9/2003 ............ B21D 5/083
(Continued)

OTHER PUBLICATIONS

Machine translation of EP1344583, Bueltmann, pp. 1-7, translated on Nov. 25, 2019. (Year: 2019).*

*Primary Examiner* — Teresa M Ekiert

(57) ABSTRACT

An apparatus and a method for producing an elongated profiled part, in which a profiled strip is produced from a flat strip by rolling and the profiled strip is embossed in sections, by means of which at least one longitudinal section of the profiled strip is offset relative to at least one other longitudinal section in a direction perpendicular to the longitudinal direction of the profiled strip, and with which method the strip is trimmed in such a way that, after the embossing, the longitudinal sections that are offset relative to each other have different cross-sections. In order to increase the reproducibility of the method, before the profiling, the flat strip is trimmed in such a way that by means of the embossing of the trimmed and profiled strip, the longitudinal sections that are offset relative to each other have different cross-sections.

16 Claims, 4 Drawing Sheets

(51) Int. Cl.
*B21D 5/06* (2006.01)
*B23K 26/00* (2014.01)
*B21D 22/26* (2006.01)

(56) References Cited

U.S. PATENT DOCUMENTS

| 5,237,846 A | 8/1993 | Brooks, Jr. |
| 2011/0088444 A1 | 4/2011 | Freitag et al. |

FOREIGN PATENT DOCUMENTS

| EP | 1344583 A1 | 9/2003 |
| EP | 1537922 A1 | 6/2005 |
| EP | 2225055 B1 | 8/2012 |
| EP | 2875877 A1 | 5/2015 |

* cited by examiner

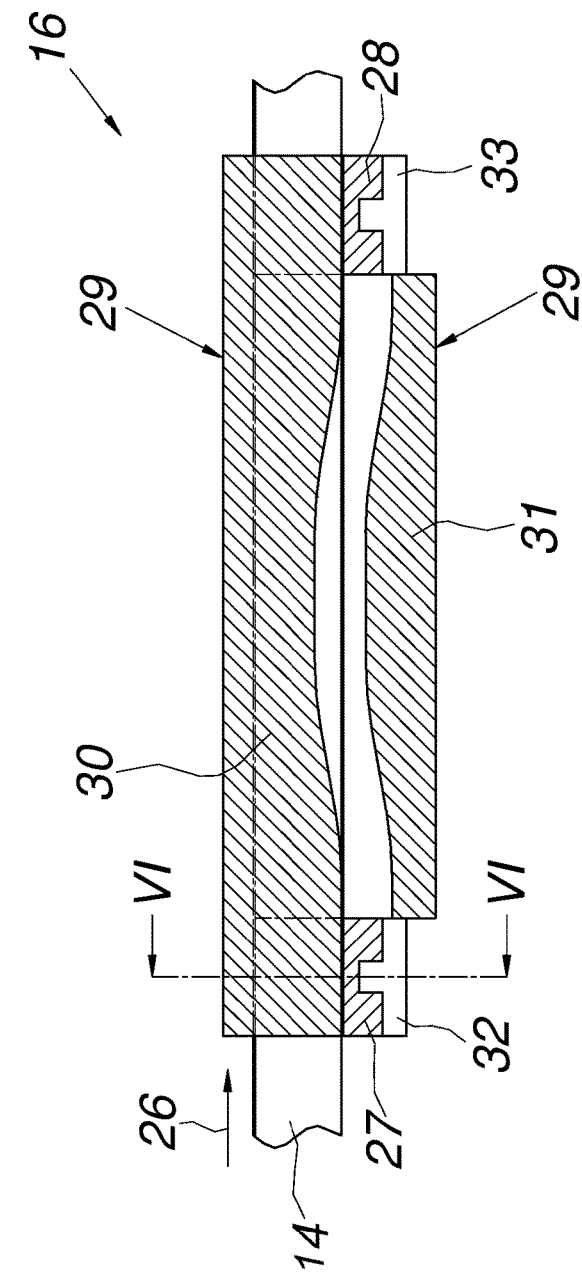
FIG.6
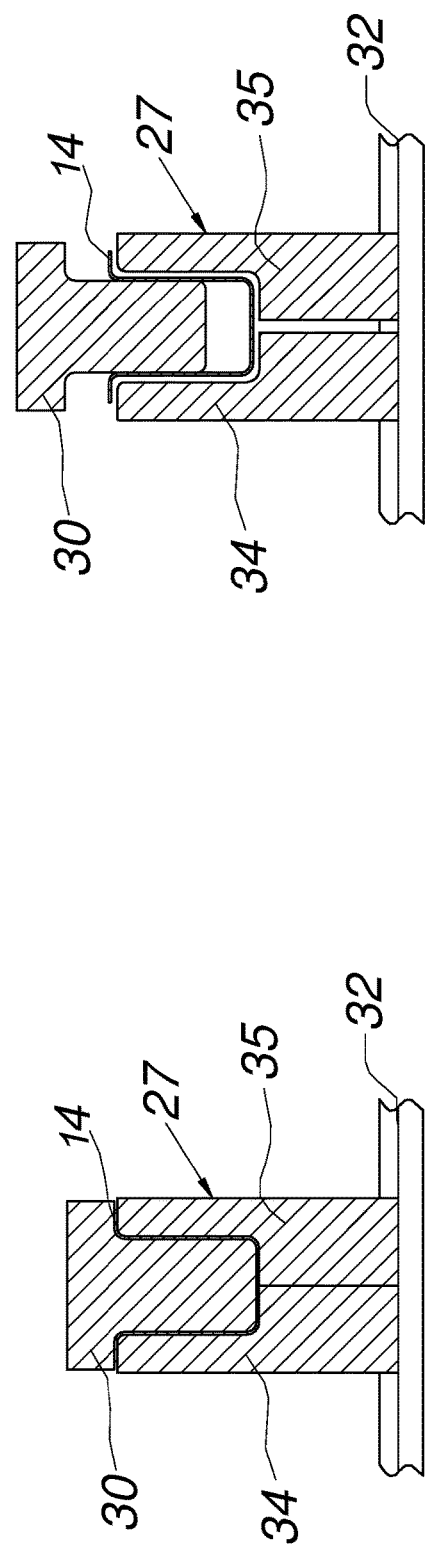
FIG.7a
FIG.7b

APPARATUS AND METHOD FOR PRODUCING AN ELONGATED PROFILED PART

FIELD OF THE INVENTION

The invention relates to an apparatus and a method for producing an elongated profiled part in which a profiled strip is produced from a flat strip by rolling and the profiled strip is embossed in sections, by means of which at least one longitudinal section of the profiled strip is offset relative to at least one other longitudinal section in a direction perpendicular to the longitudinal direction of the profiled strip, and with which method the strip is trimmed in such a way that, after the embossing, the longitudinal sections that are offset relative to each other have different cross-sections.

BACKGROUND OF THE INVENTION

In order to produce an elongated profiled part with a vertical offset and different cross-sections over the course of the profile, it is known in the prior art (EP1344583B1) to profile a flat metal band, then to emboss it in sections, and then finally to trim it. By means of the sectional embossing, two of the longitudinal sections of the profiled strip are offset in a direction perpendicular to the longitudinal direction— i.e. a vertical offset between the longitudinal sections of the elongated profiled part is produced and the trimming that is carried out after the embossing in the running direction of the strip provides for the different cross-sections in the profiled and embossed strip. Disadvantageously, the trimming step in particular requires a high precision in the positioning and supporting of the profiled pan relative to a cutting tool in order to be able to ensure the dimensional accuracy of the elongated profiled part. Production tolerances in the trimming therefore have an increased influence on the reproducibility of the method. In addition, for the offsetting of the longitudinal sections, the embossing tools require comparatively powerful embossing forces, thus reducing the energy efficiency of the method and along with an increased tool wear, increasing the method costs. This approach also requires acceptance of a decrease in the durability of the elongated profiled part due to material removal from the profiled strip.

SUMMARY OF THE INVENTION

The stated object of the invention based on the above-explained prior art, therefore, is to simplify a method for producing an elongated profiled part and thus to improve it in terms of its reproducibility. In addition, the method should be more energy efficient and inexpensive to use and should enable the production of extremely durable elongated profiled parts.

If a flat strip is trimmed before the profiling in such a way that by means of the embossing of the trimmed and profiled strips, the longitudinal sections that are offset from each other have different cross-sections, then this makes it possible to considerably simplify the comparatively labor-intensive method step of the trimming from the prior art. With the method according to the invention—by contrast with the prior art—the trimming can specifically be carried out before a forming, i.e. before the profiling and embossing, of the flat strip. Consequently, plastic deformations of the strip do not have to be taken into account during trimming, which can permit the trimming to be carried out reliably, relatively simply, and with comparatively high production accuracy. It is thus possible to significantly increase the reproducibility of the method. It is also possible—by trimming the flat strip before it is formed, i.e. before the profiling and embossing—to reduce the expenditure of force and energy required for this. This can therefore contribute not only to reducing wear on the embossing tool, but also to increasing the energy and cost efficiency of the method.

The risk of warpage during the profiling and embossing of the strip can be reduced if the flat strip is trimmed at its two longitudinal strip edges. This is all the more so if the strip is trimmed equally at its two longitudinal strip edges and thus due to the symmetrical properties, the forming constraints can be evened out across the width and length of the strip.

The operation of the method can be further simplified if the flat strip is trimmed by separating or by removal. In particular, stamping and laser cutting could excel in this regard.

The operation of the embossing step can be additionally simplified if the flat and trimmed strip is profiled by rolling to form a hat profile, at least in sections in the longitudinal direction. The flanges of the hat profile can specifically serve as supporting surfaces for a hold-down device in order to further facilitate the embossing.

Preferably, the strip is profiled to form a hat profile exclusively in its untrimmed longitudinal regions in order not to jeopardize the sectional embossing of the profiled strip for producing the offset longitudinal section.

If as the profiled strip is being embossed in the longitudinal direction, it is continuously formed into a hat profile, then this makes it possible to accelerate the method for producing a profiled part with flanges extending along the longitudinal sides.

In order to reduce the pressing force during the embossing, the embossing of the profiled strip can be carried out in a plurality of embossing steps. This also makes it possible to prevent damage to the embossing tool—as a result of which the method permits profiled parts to be produced more reliably and thus more advantageously.

If during the final embossing, flanges extending over the longitudinal sections are embossed at least in some regions, then this makes it possible in a simple way to achieve a particularly straight flange end at the longitudinal sides of the profiled part. It is thus more easily possible to simply adapt the flanges of the mutually offset longitudinal sections of the pre-embossed strip to each other during the final embossing. This can also stabilize the shaping produced by preceding embossing steps and can thus yield a dimensionally accurate profiled part, which can improve the reproducibility of the method.

The dimensional accuracy of the elongated profiled part can be further improved by subjecting both sides of the profiled strip to tensile strain in the longitudinal direction during the embossing. For example, this can reduce the risk of ripple formation in the profiled part.

A continuous method can be achieved if a plurality of elongated profiled parts are cut from the strip, which has been trimmed multiple times and embossed multiple times. Preferably a cutting to length can permit a cutting without material removal in this case.

Preferably, after the embossing of the strip, the elongated profiled part is cut to length in order to achieve a continuous method that uses an endless strip.

The method according to the invention can be significantly improved in terms of the dimensional accuracy of the profiled part if the course of the cutting line is changed during trimming of the strip in order to compensate for a deviation of a measured actual geometry from a predefined desired geometry of the elongated profiled part.

Another stated object of the invention is to modify the design of an apparatus for producing an elongated profiled part from a flat strip of the type explained at the beginning in such a way that it can produce a profiled part in a stable, rapid, and inexpensive fashion.

The invention attains the stated object in that the trimming device is provided before the profiling device in the running direction of the strip and is embodied to trim the strip in such a way that by embossing the trimmed and profiled strip, the longitudinal sections that are offset relative to each other have different cross-sections.

If the trimming device is provided before the profiling device in the running direction of the strip, then due to the consequently reduced amount of material to be formed in the subsequent devices—namely in the profiling and embossing devices—a reduction in force can be achieved and thus the apparatus can be improved in terms of durability. Furthermore, in a flat strip, an extremely exact trimming is possible, which can enable the production of dimensionally accurate profiled parts. If the trimming device is also embodied to trim the strip in such a way that due to the embossing of the trimmed and profiled strip, the mutually offset longitudinal sections have different cross-sections, then the apparatus can be embodied in a particularly compact and inexpensive way.

A continuously operating apparatus can be achieved if the apparatus has a length-cutting device provided after the embossing device in the running direction of the strip for cutting to length profiled parts from the strip.

The risk of ripple formation in the profiled part during embossing can be significantly reduced if the embossing device has at least two hold-down devices that firmly clamp the profiled strip during embossing and consequently, a longitudinal tension can be produced on both sides. In a comparatively simply designed way, this can be attained in that either the upper or lower tool of the embossing tool cooperates with the hold-down device to firmly clamp the profiled strip during embossing with the aid of the respective other tool, which is movable between the two hold-down devices.

The precision of the apparatus can be increased if the apparatus has a regulating device and has a measuring device in data communication with the regulating device, with which measurement data about the actual geometry of the elongated profile are recorded and the regulating device is in data communication with the trimming device so as to change the cutting line of the trimming device depending on a comparison of the measurement data with predefined data for the desired geometry of the elongated profiled part in order to compensate for deviations of the actual geometry from the predefined desired geometry of the elongated profiled part.

BRIEF DESCRIPTION OF THE DRAWINGS

In the figures, the subject of the invention is depicted in greater detail by way of example based on an embodiment variant. In the drawings, FIG. 6 is a partially cut-away view of the embossing device of the apparatus according to FIG. 4, FIG. 7a shows a sectional view according to the section line VI-VI in FIG. 6, and FIG. 7b shows a sectional view of the hold-down device according to FIG. 7a in the open position.

DETAILED DESCRIPTION OF THE PREFERRED EMBODIMENTS

Figure 1:
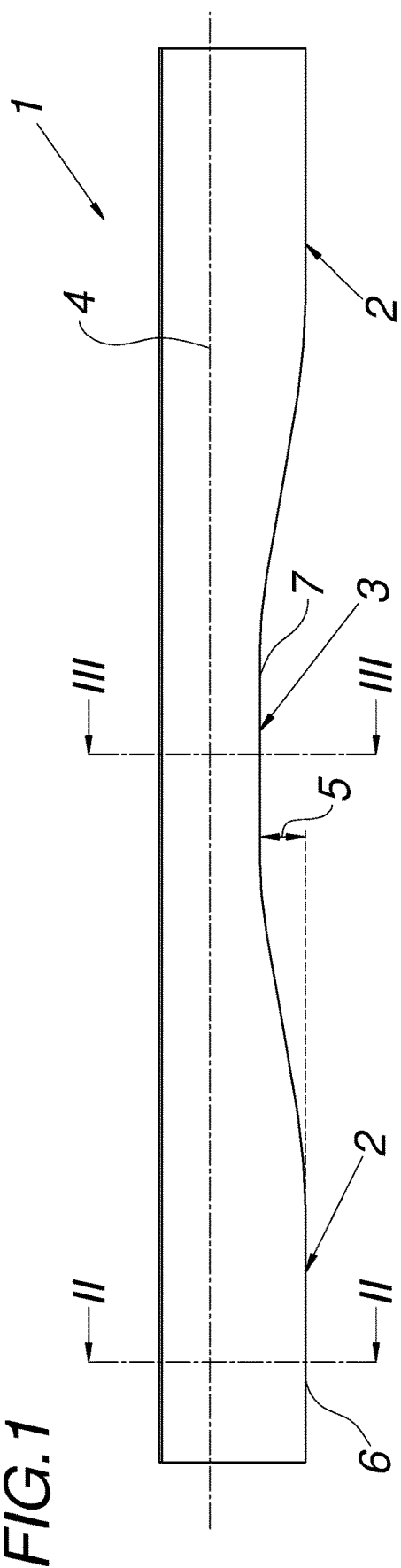
FIG. 1 shows a side view of an elongated profiled part.
Figure 3:
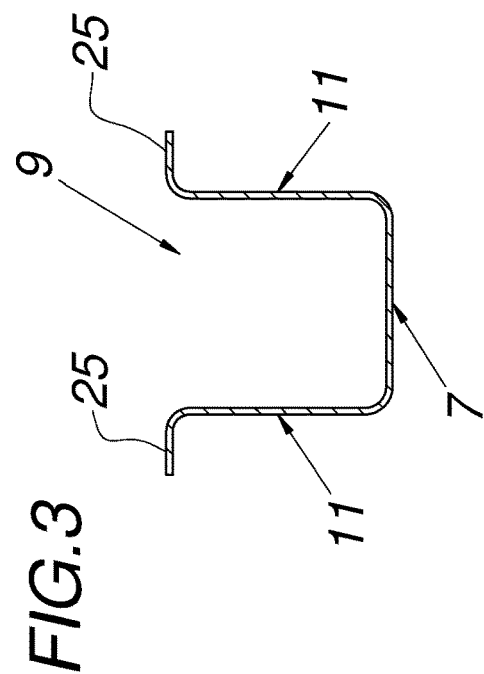
FIG. 3 shows a sectional view according to the section line III-III in FIG. 1.
Figure 2:
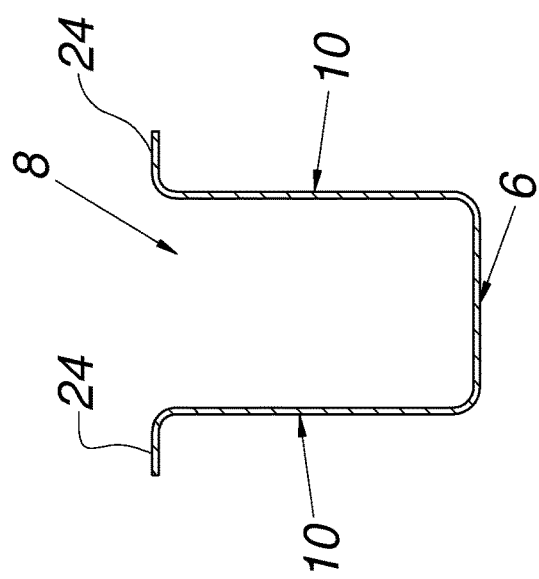
FIG. 2 shows a sectional view according to the section line II-II in FIG. 1.

FIGS. 1, 2, and 3 show examples of an elongated profiled part 1 produced with the method according to the invention. This elongated profiled part 1 has essentially two different longitudinal sections 2, 3 with a U-shaped profile—which is shown in FIGS. 2 and 3. The middle longitudinal section 3 is offset relative to the adjacent longitudinal sections 2 in a direction perpendicular to the longitudinal direction 4 of the profiled part 1. FIG. 1 shows the maximum offset 5 in the direction perpendicular to the longitudinal direction 4 of the profiled part 1. Starting from a bottom path that is in the middle and parallel to the bottoms 6 of the longitudinal sections 2, the bottom 7 of the longitudinal section 3 adjoins the bottoms 6 of these longitudinal sections 2 by means of inclined bottom paths. This bottom path shown for the longitudinal section 3 is intended as an example, any bottom path is conceivable, for example rectangular, V-shaped, etc.; it is enough for the invention if on the strip 14, only two mutually offset longitudinal sections 2 and 3 on the strip 14 are provided. Furthermore, the cross-section 8 of the longitudinal sections 2 shown in FIG. 2 differs from the cross-section 9 of the longitudinal section 3 shown in FIG. 3 at least in terms of the height of the respective legs 10, 11.

Figure 4:
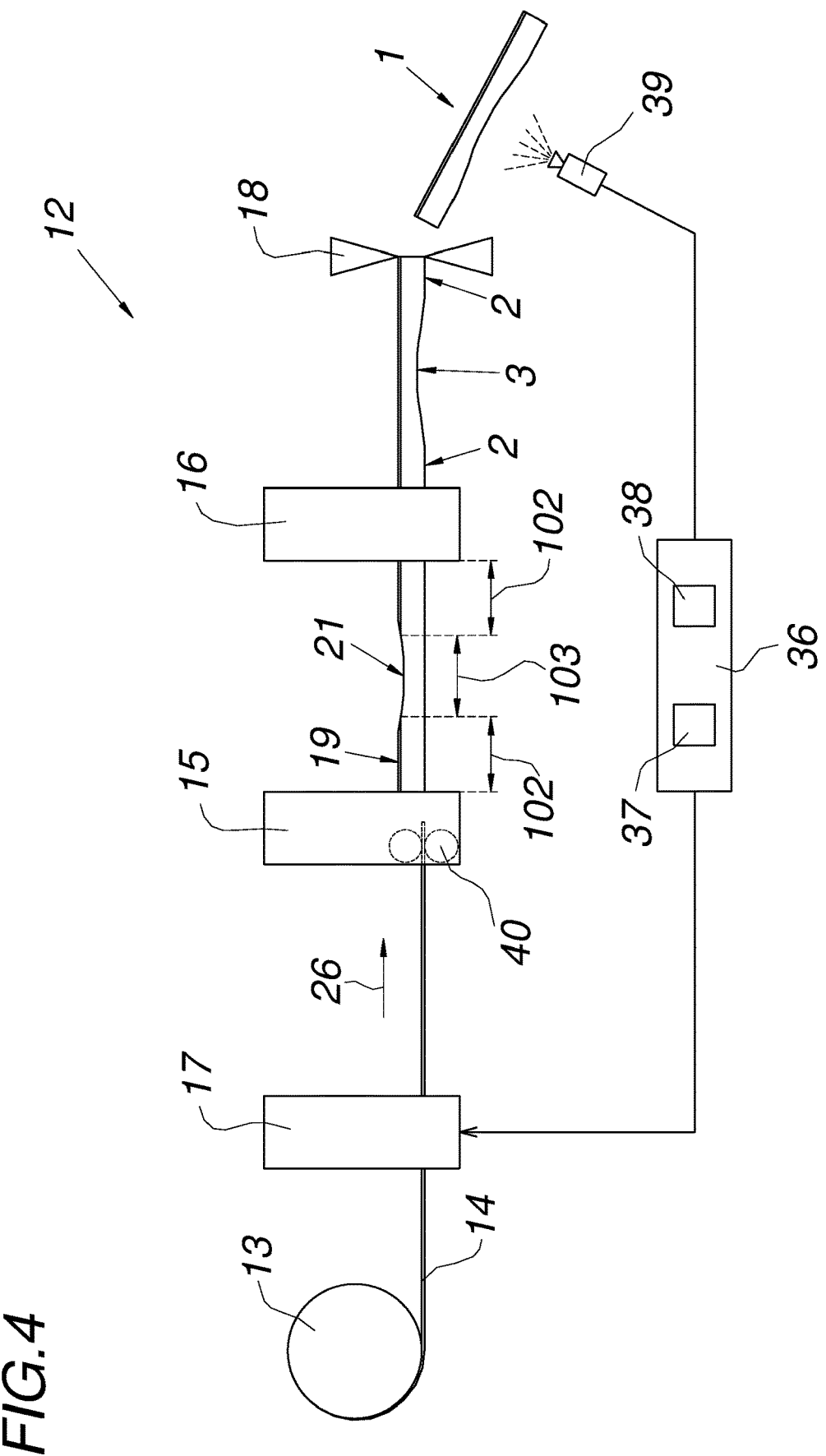
FIG. 4 shows a schematic view of an apparatus for producing the elongated profiled part according to FIG. 1.

This elongated profiled part 1 is produced with the aid of an apparatus 12 schematically depicted in FIG. 4. To this end, a strip 14, namely steel strip, is unwound from a coil 13, is roller-profiled, embossed in some sections, trimmed, and cut to length—in order to thus produce a plurality of elongated profiled parts 1 in a continuous method. As is known, the strip can be a split strip.

The apparatus 12 has a profiling device 15, an embossing device 16, a trimming device 17, and a length-cutting device 18. The profiling device 15 profiles the strip 14 in order to give the elongated profiled part 1 the basic cross-sectional shape. The embossing device 16 provided after the profiling device 15 in the running direction 26 of the strip 14 produces the longitudinal sections 2, 3 that are offset in a direction perpendicular to the longitudinal direction 4 of the profiled strip 14. The trimming device 17 subjects the strip 14 to a cutting process at least in sections along at least one of its longitudinal strip edges 19, 20. As is apparent in FIG. 5, this takes place for the strip 14 along an open cutting line 21, 22. The length-cutting device 18 cuts to length a plurality of elongated profiled parts 1 from the endless strip 14.

According to the invention, by contrast with the prior art, the trimming of the flat strip 14 is carried out before the profiling device 15. Now, the trimming device 17 positioned before the profiling device 15 in the running direction 26 of the strip 14 trims the flat strip 14 before the profiling in such a way that by means of the embossing of the trimmed and profiled strip 14, the mutually offset longitudinal sections 2, 3 have different cross-sections 8, 9. This trimming of the flat strip 14 with an open cutting line 21, 22 can take place by separating, for example stamping and/or cutting out, or by removal, for example laser cutting and/or water cutting, etc., which has not been demonstrated in detail. The flat strip 14 therefore has a contoured shape along its longitudinal strip edges 19, 20, thus providing less strip material in the offset longitudinal section 3. This is done on the one hand to reduce the expenditure of force during the embossing and also to produce the different cross-section 9 in this longitudinal section 3 after the embossing. In addition, it is not necessary to take into account plastic deformations of the strip 14 when trimming the flat strip 14, which makes the method significantly easier to manage and thus makes it more reproducible. High production accuracy in the elongated profiled part 1 produced is thus easier to obtain.

Figure 5:
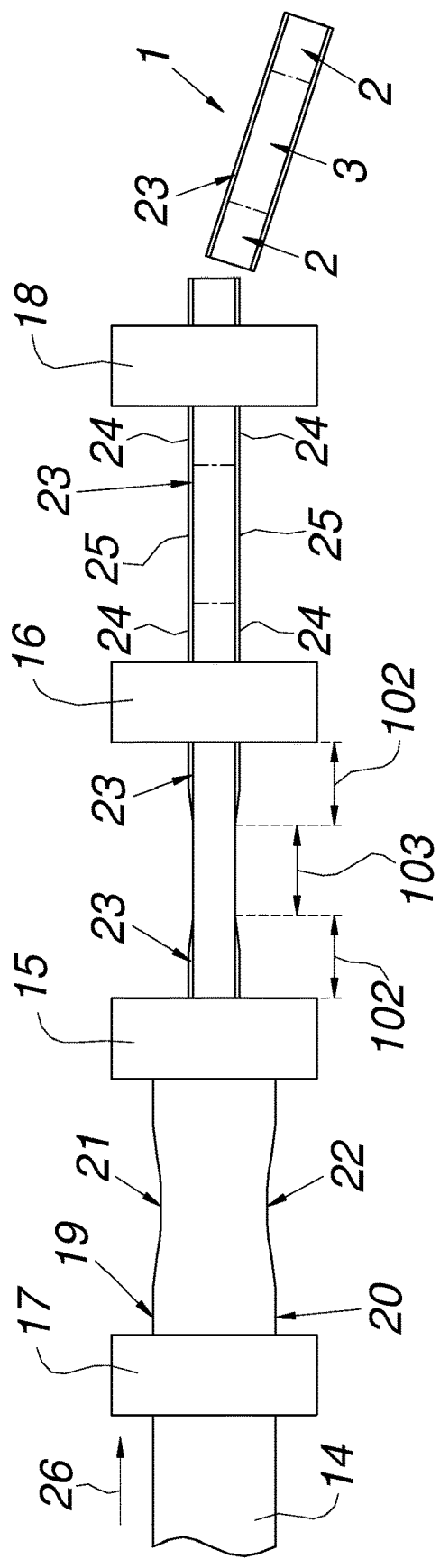
FIG. 5 is a partially cut-away top view of the apparatus according to FIG. 4.

As is apparent from FIG. 5, the elongated profiled part 1 is embodied symmetrically, viewed in the longitudinal direction 4 because the flat strip 14 is trimmed equally at its two longitudinal strip edges 19, 20.

With the profiling device 15, the flat, and trimmed strip 14 is roller-profiled with rollers 40 that are only hinted at in FIG. 4 in order, by means of this continuous bending method, to inexpensively produce the basic shape of the elongated profiled part 1. In this connection, the flat and trimmed strip 14 is profiled at least in sections in the longitudinal direction 4, to form a hat profile 23 or omega profile, namely in its untrimmed longitudinal regions 102. The embossing device 16 completes the hat profile 23 extending in the longitudinal direction 4 of the strip 14—namely in that as the profiled strip 14 is being embossed in the longitudinal direction 4, it is continuously shaped into a hat profile, mainly in the trimmed regions 103 of the strip 14.

The embossing of the profiled strip 14 takes place in multiple steps. To this end, the embossing device 16 has a plurality of presses one after another, with cooperating tools—which is not shown in detail in the drawings. The required expenditure of force for the respective embossing steps of the embossing device 16 is further reduced according to the invention. This is particularly true if flanges 24, 25 extending at least in some regions of the longitudinal sections 2, 3 are embossed as the pre-embossed strip 14 undergoes final embossing. To this end, in the exemplary embodiment, both sides of the profiled strip 14 in the lateral direction of the strip 14 are subjected to tensile strain in the longitudinal direction 4 during the embossing in order to prevent a potential formation of ripples extending across the flanges 24, 25. This achieves a particularly uniform end of the profile across the flanges 24, 25.

FIGS. 6, 7a, and 7b show the embossing device 16 in greater detail, which has two hold-down devices 27, 28 and an embossing tool 29 with an upper tool 30 and a lower tool 31.

The hold-down devices 27, 28 cooperate with the upper tool 30 in order to firmly clamp the strip 14 during the embossing, as is apparent from FIGS. 6 and 7a. To this end, the upper tool 30 presses the strip 14 onto the hold-down devices 27 and 28 and firmly holds the strip 14 with frictional, nonpositive engagement. As the embossing tool 29 is closed or is closed further, in that the lower tool 31 is moved toward the upper tool 30, the strip 14 is then embossed in sections—as already described above. The firm clamping of the strip 14 makes it possible to exert a longitudinal tension on the strip 14, which prevents rippling of the strip 14. It can also be inferred from FIG. 7 that the hold-down devices 27, 28 are each composed of two jaws 34, 35 supported on a guide 32, 33 and can be opened and closed perpendicular to the running direction 26, as is clear from a comparison between FIGS. 7a and 7b. The insertion and retraction of the upper tool 30 in the hold-down devices 27 are also particularly visible in FIG. 7b.

As already described above, the embossing of the profiled strip 14 can be carried out in a plurality of embossing steps. To this end, the embossing device 16 can be associated with a plurality of successive embossing steps of the kind shown in FIG. 6, with hold-down devices 27, 28 and embossing tools 29, but this plurality of steps is not shown in detail in the drawing.

As is also apparent from FIG. 4, the apparatus 12 is additionally equipped with a regulating device 36 in order to thus improve and/or guarantee the dimensional accuracy of the profiled part 1 produced therewith. To this end, the regulating device has an "I regulator" (integral element, I element) in order to put an stop to regulating deviations and to thus ensure a complete compensation for a deviation of the actual geometry in the elongated profiled part 1 from the predefined desired geometry of the elongated profiled part 1. Other regulators or standard regulators with P-, PI-, PD-, and PID behaviors are also conceivable.

The desired geometry of the elongated profiled part is predefined for the regulating device 36 in the form of data 37. These data 37 are compared to measurement data 38 that a measuring device 39 connected to the regulating device 36 for data transmission records from the finished profiled part 1. In FIG. 4, this measuring device 39 is embodied as a camera for capturing video data. Other measuring devices 39 are conceivable, such as a laser scanner, etc., in order to be able to detect measurement data that depend on the actual geometry of the profiled part 1.

A deviation that can take into account a predetermined production tolerance is compensated for by the regulating device 36 to the effect that for at least one subsequent profiled part, the cutting line 21, 22 of the trimming device 17 is changed. To this end, the regulating device 36 is connected to the trimming device 17 for data transmission in order to thus bring the actual geometry of as yet incompletely produced profiled parts closer to the desired geometry and thus into agreement with one another. Tolerances in the apparatus 12 and production tolerances in the strip 14 can thus be taken into account and compensated for with particular speed, which makes the method extremely reproducible and makes the apparatus 12 stable.

The invention claimed is:

1. A method for producing an elongated profiled strip, comprising:
    trimming at least one longitudinal section of a flat strip to produce a trimmed longitudinal section, while at least one longitudinal section of the flat strip remains as an untrimmed longitudinal section;
    profiling the trimmed longitudinal section and the untrimmed longitudinal section of the flat strip with rollers to produce the elongated profiled strip; and
    stamping the elongated profiled strip in at least the trimmed longitudinal section, by which the trimmed longitudinal section of the elongated profiled strip is offset and has a different cross-section relative to the untrimmed longitudinal section in a direction perpendicular and vertical to a longitudinal direction of the elongated profiled strip.

2. The method according to claim 1, wherein the trimming step comprises trimming the flat strip at its two longitudinal edges.

3. The method according to claim 2, wherein the trimming step comprises trimming the flat strip equally at its two longitudinal edges.

4. The method according to claim 1, wherein the trimming step comprises trimming the flat strip by separating or by removal.

5. The method according to claim 4, wherein the trimming step comprises trimming the flat strip by stamping or by laser cutting.

6. The method according to claim 1, comprising profiling the flat and trimmed strip by rolling to form a hat profile, at least in sections in the longitudinal direction.

7. The method according to claim 6, comprising profiling the strip to form the hat profile exclusively in its untrimmed longitudinal regions.

8. The method according to claim 1, comprising continuously forming the elongated profiled strip into a hat profile as the elongated profiled strip is being stamped in the longitudinal direction.

9. The method according to claim 1, comprising carrying out the stamping of the elongated profiled strip in a plurality of stamping steps.

10. The method according to claim 9, wherein during a final stamping step of the plurality of stamping steps, flanges extending over the longitudinal sections are stamped at least in some regions.

11. The method according to claim 1, wherein both sides of the elongated profiled strip are subjected to tensile strain in the longitudinal direction during the stamping.

12. The method according to claim 1, comprising carrying out the trimming step a plurality of times, carrying out the stamping step a plurality of times, and cutting a plurality of elongated profiled parts from the elongated profiled strip.

13. The method according to claim 12, wherein a course of a cutting line is changed during trimming of the strip in order to compensate for a deviation of a measured actual geometry from a predefined desired geometry of the elongated profiled part.

14. An apparatus for producing an elongated profiled strip from a flat strip in a running direction of the strip, the apparatus comprising:
a trimming device for trimming at least one longitudinal section of the flat strip to produce a trimmed longitudinal section, while at least one longitudinal section of the flat strip remains as an untrimmed longitudinal section;
a profiling device which comprises at least one roller for profiling the trimmed longitudinal section and the untrimmed longitudinal section of the flat strip to produce the elongated profiled strip; and
a stamping device, which is provided after the profiling device in the running direction of the strip and has at least one stamping tool for stamping the elongated profiled strip in at least the trimmed longitudinal section, resulting in the trimmed longitudinal section of the elongated profiled strip being offset and having a different cross-section relative to the untrimmed longitudinal section in a direction perpendicular and vertical to the longitudinal direction of the elongated profiled strip, wherein the stamping device comprises at least two hold-down devices and either an upper or a lower tool of the stamping tool cooperates with the at least two hold-down devices to firmly clamp the elongated profiled strip during stamping with aid from the either upper or lower tool of the stamping tool, which is movable between the at least two hold-down devices.

15. The apparatus according to claim 14, further comprising a length-cutting device provided after the stamping device in the running direction of the strip for cutting to length profiled parts from the strip.

16. The apparatus according to claim 14, further comprising a regulating device and a measuring device in data communication with the regulating device, with which measurement data about an actual geometry of an elongated profile are recorded and the regulating device is in data communication with the trimming device so as to change a cutting line of the trimming device depending on a comparison of the measurement data with predefined data for a desired geometry of the elongated profiled part in order to compensate for deviations of the actual geometry from the predefined desired geometry of the elongated profiled part.

* * * * *